Nov. 8, 1932.  R. N. MURPHY  1,886,510
CABLE LAYING PLOW
Filed Nov. 1, 1930  3 Sheets-Sheet 1
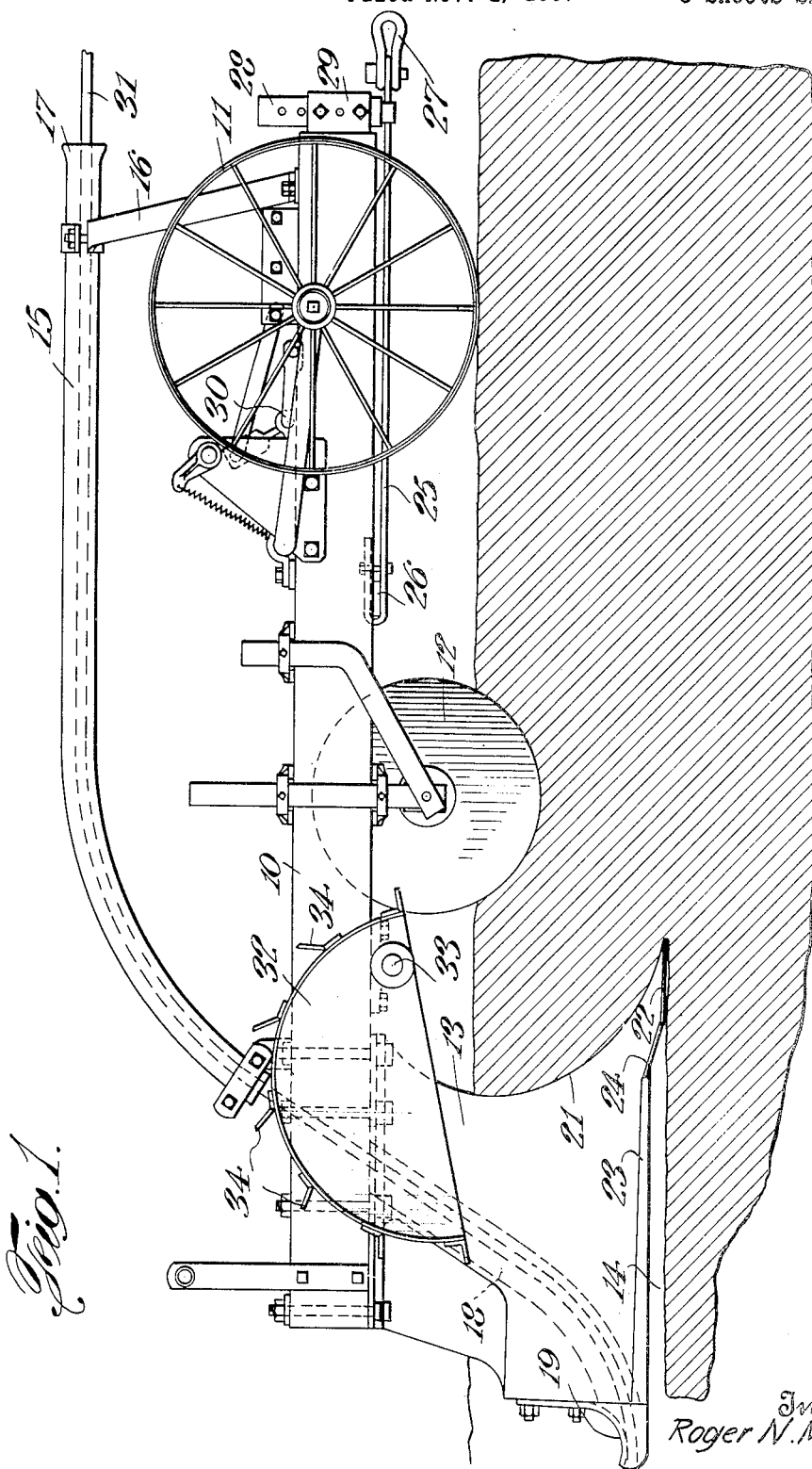
Fig. 1.
Inventor
Roger N. Murphy
By his Attorneys

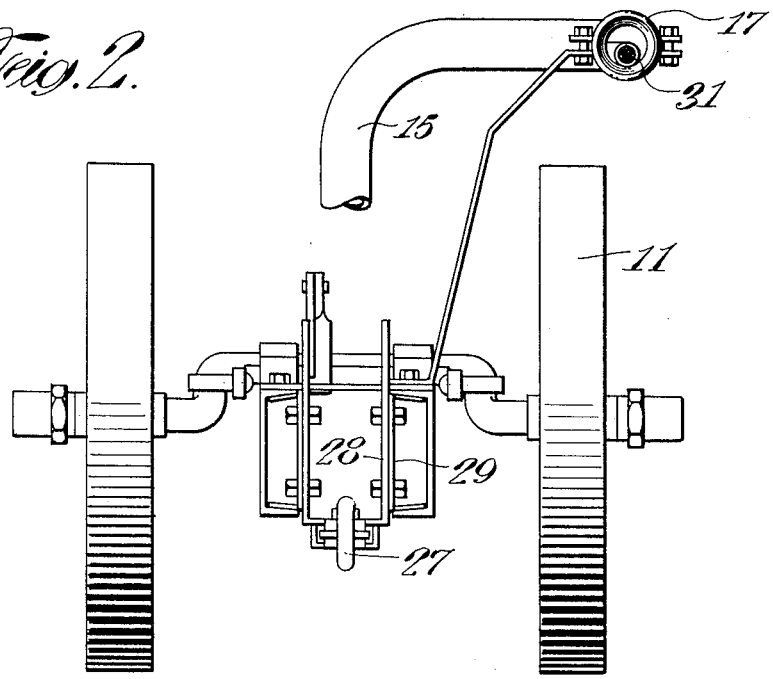
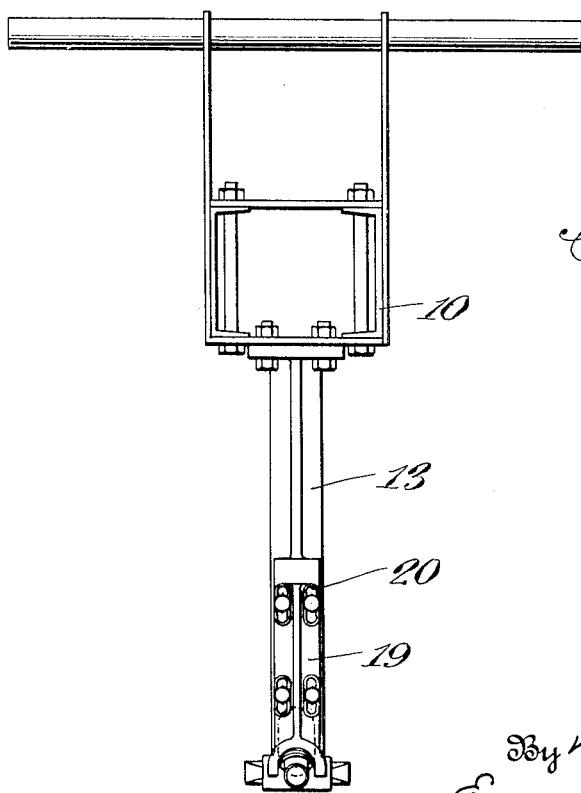

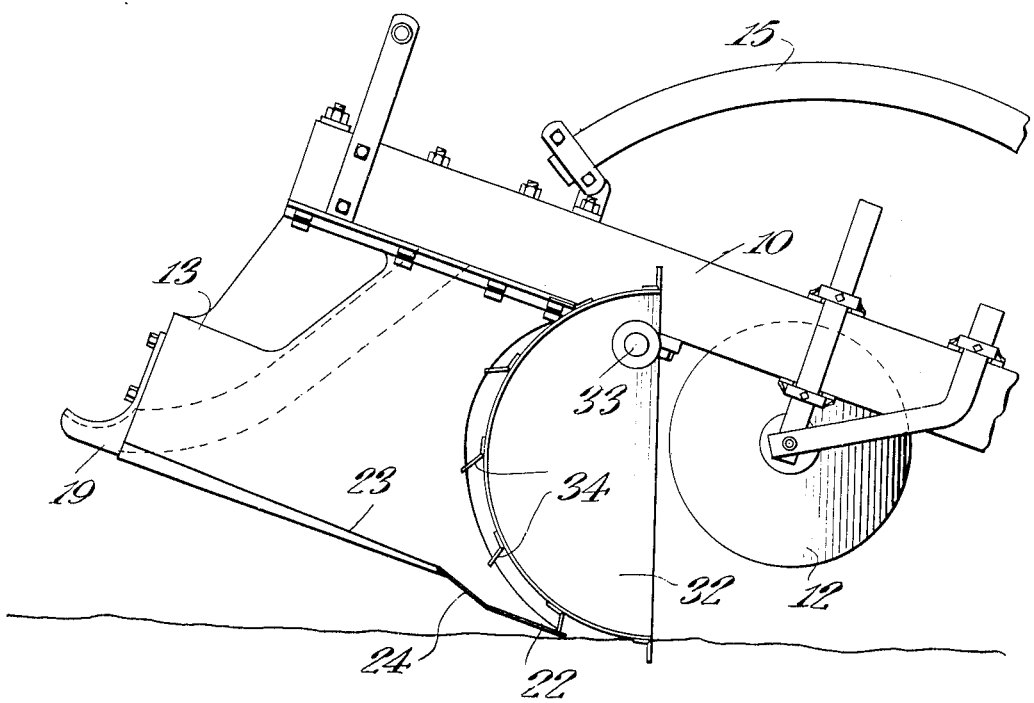
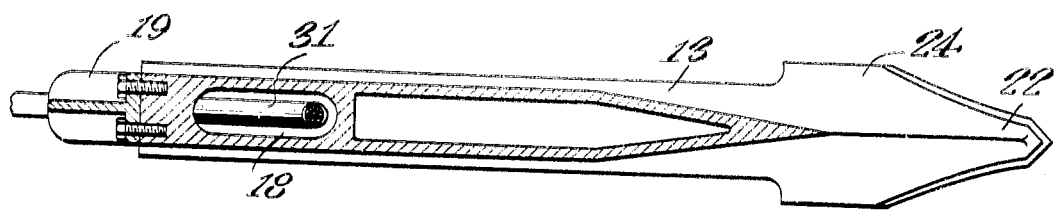

Patented Nov. 8, 1932

1,886,510

UNITED STATES PATENT OFFICE

ROGER N. MURPHY, OF ROME, NEW YORK, ASSIGNOR TO GENERAL CABLE CORPORATION, OF NEW YORK, N. Y., A CORPORATION OF NEW JERSEY

CABLE LAYING PLOW

Application filed November 1, 1930. Serial No. 492,697.

This application relates to cable laying machines and an object of the invention is to provide a machine for laying underground cable, constructed and arranged to form a trench and lay the cable therein, the walls of the trench closing in over the cable so that the latter is completely buried without the necessity of any manual digging or refilling operations.

This and other objects which will be apparent to those skilled in this particular art are accomplished by means of the invention illustrated in the accompanying drawings in which—

Fig. 1 is a side elevation of a cable laying plow constructed in accordance with one embodiment of this invention.

Fig. 2 is a plan view thereof.

Fig. 3 is a rear view thereof.

Fig. 4 is a side elevation of one end of the machine showing the lifting discs in operation, and Fig. 5 is a horizontal section through the plowshare.

The cable laying machine which has been chosen for the purposes of illustration is arranged to operate in connection with a cable which has previously been laid along the surface of the ground, approximately along the line along which it is to be buried. The machine is provided with a suitable trench or furrow forming device which cuts the desired furrow as the machine is drawn along the predetermined path. Means are provided for picking up the cable and depositing it in the furrow in the rear of the plowing mechanism, and the formation of the furrow is such that the walls thereof close in over the cable as the machine is drawn along. Mechanism which is more or less standard with agricultural machinery is employed for varying the depth at which the plowing mechanism operates and hence the depth at which the cable is laid. At the same time, a novel form of plowshare is provided for tending to draw the share into the ground as the machine is moved along.

In the drawings, the machine includes a plow beam 10 mounted upon suitable wheels 11 and having a rotary colter 12 supported thereon in front of a plowshare 13 mounted toward the rear of the beam. The plowshare is arranged to cut a suitable furrow or trench 14 beyond the colter 12 which is used where it is necessary to cut sod ahead of the plowshare.

Mechanism is provided for picking up a cable which has been previously laid along the ground and depositing it at the bottom of the furrow 14 as the machine is moved along. As illustrated, this mechanism includes a cable pick-up which is shown in the form of a pipe 15 extending longitudinally of the plow beam and supported at the front upon a bracket 16 which extends at an angle so as to point the mouth 17 of the pipe toward that side of the machine adjacent the cable. The mouth 17 can be located on either side of the machine by reversing the inclined arm 16. The rear end of the pipe 15 is curved downwardly and delivers the cable to a conduit 18 which is illustrated as formed in the plowshare and which opens into the furrow 14 adjacent the bottom thereof at the rear of the share for delivering the cable to the bottom of the trench. An adjustable presser foot 19 having slots 20 my means of which it is adjustably supported at the rear of the plowshare is so positioned as to bear on the cable emerging from the conduit 18 and press it into position at the bottom of the furrow.

The plowshare is formed as illustrated with a curved cutting edge 21 terminating in the point 22. The bottom of the share is formed with horizontally extending surfaces 23 and inclined surfaces 24 which engage the ground at such an angle as to tend to draw the share downwardly into the ground, thus aiding the cable laying operation and holding the plowshare at the proper depth.

A draw bar 25 is secured to the plow beam by suitable connecting means 26 at a point to the rear of the wheels 11 and a hitching eye 27 is provided on the front of the draw bar. The height of the hitch can be controlled by varying the height of the eye 27. This is done by means of a bracket plate 28 which is adjustably secured to brackets 29 on the front of the plow beam and which is connected to the draw bar adjacent the eye so that varying the position of the plate 28 will vary the height of the eye 27.

Mechanism which is common to all agricultural machinery of this general type and which is indicated generally at 30 is provided for varying the depth of operation of the plowshare 13 and hence the depth at which the cable 31 is laid. To assist in drawing the plowshare out of the ground at the end of the cable laying operation, a suitable lifting mechanism is employed which includes a pair of cam discs 32 secured to a cross shaft 33 supported in bearings on the bottom of the beam. The peripheral face of each disc is provided with a plurality of cleats 34. In normal operation, the discs are in the position illustrated in Fig. 1 in which they drag along the ground in an inoperative position. When the cable laying operation is completed the discs are lifted to cause the front cleats 34 to engage in the ground so that further movement of the machine rotates the discs to the position indicated in Fig. 4 raising the plowshare from the ground by a cam action.

In operation, assuming a length of cable has been laid along the ground parallel the path that it has to follow when laid underground, the machine is drawn along such path by any suitable means. The pick-up mechanism, illustrated as in the form of the pipe 15 and which may obviously be of any other form, lifts the cable from the ground as the machine is drawn along and passes it rearwardly through the pick-up pipe 15 and downwardly through the conduit 18 in the plowshare and outwardly under the presser foot 19 which positions it in the bottom of the trench or furrow 14. The walls of the conduit 18 prevent the soil or ground from injuring the surface of the cable and the latter is protected from any contact with the soil, rocks or the like until it is definitely positioned and laid in the bottom of the trench. The latter is formed in such a way by the plow share that the walls thereof close together after the machine has passed and no refilling operation is necessary to cover the cable. When the desired length of cable has been laid, the device can be raised from the ground by the operation of the cam discs as above described.

Although I have described in detail one specific embodiment of the present invention it will be apparent that various changes, additions, omissions and substitutions can be made therein without departing from the spirit of this invention or the scope of the appended claims.

What I claim as new and desire to secure by Letters Patent is:—

1. In combination, a movable frame, a furrow cutting mechanism operated by movement of the frame and means for depositing within said furrow a length of cable previously laid along the ground.

2. In combination, a furrow forming plow, means for depositing within the furrow formed thereby a length of cable previously laid along the ground including a pick-up mechanism and means for directing the cable from said pick-up mechanism into said furrow.

3. The combination in a cable laying plow of a draw bar, a plow share secured thereto and means for depositing a cable in the furrow formed by said share including a conduit formed in said share and extending downwardly to the bottom thereof, means for directing the cable into said conduit and adjustable means for positioning the cable issuing from said conduit on the bottom of said furrow.

4. The combination in a cable laying plow of a plow beam, a furrow forming plowshare supported thereon, means operated by movement of the plow for picking up a cable previously laid along the ground, means for depositing said cable in the furrow formed by said share including a cable protecting conduit extending downwardly into said furrow and an adjustable depressor for positioning the cable issuing from said conduit on the bottom of said furrow.

5. The combination in a cable laying plow of a plow beam, a furrow forming plowshare secured thereto and provided with a cable protecting conduit extending and opening into the furrow formed thereby, mechanism operated by movement of the plow for depositing in said furrow a cable previously laid along the ground including a pick-up pipe for directing said cable into said conduit and an adjustable depressor for positioning the cable issuing from said conduit on the bottom of said furrow.

6. The combination in a cable laying plow of a draw bar, a plow share secured thereto, means for depositing a cable in the furrow formed by said share including a conduit formed in said share and extending downwardly to the bottom thereof and an adjustable depressor for engaging the cable as it emerges from said conduit for positioning said cable on the bottom of said furrow.

7. The combination in a cable laying plow of a plow beam, a furrow forming plow share secured thereto and provided with a cable protecting conduit extending and opening into the furrow formed thereby and mechanism operated by movement of the plow for depositing in said furrow a cable previously laid along the ground including a pick-up mechanism for directing said cable from the ground into said conduit.

In testimony whereof, I have signed my name to this specification this 6 day of October.

ROGER N. MURPHY.